United States Patent
Albaroudi et al.

(10) Patent No.: US 6,672,081 B1
(45) Date of Patent: Jan. 6, 2004

(54) SYSTEM AND METHOD OF PREVENTING ICING IN AN AIR CYCLE SYSTEM

(75) Inventors: Homam Albaroudi, Ypsilanti, MI (US); Shane A. Harte, Farmington Hills, MI (US)

(73) Assignee: Visteoo Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/284,754

(22) Filed: Oct. 31, 2002

(51) Int. Cl.⁷ .................................................. F25B 9/06
(52) U.S. Cl. ............................................. 62/87; 62/172
(58) Field of Search .............................. 62/86, 87, 172, 62/401, 402

(56) References Cited

U.S. PATENT DOCUMENTS

| | | |
|---|---|---|
| 3,274,789 A | 9/1966 | Mitchell |
| 3,355,905 A | 12/1967 | Berhold et al. |
| 4,295,518 A * | 10/1981 | Rannenberg .................... 165/2 |
| RE32,100 E | 4/1986 | Rannenberg |
| 4,580,406 A | 4/1986 | Nims |
| 5,025,642 A * | 6/1991 | Brunskill et al. .............. 62/402 |
| 5,214,935 A * | 6/1993 | Brunskill ....................... 62/402 |
| 5,279,130 A | 1/1994 | Donaldson |
| 5,553,461 A * | 9/1996 | Hitzigrath et al. ............ 62/150 |

* cited by examiner

Primary Examiner—Henry Bennett
Assistant Examiner—Malik N. Drake
(74) Attorney, Agent, or Firm—Brinks Hofer Gilson & Lione

(57) ABSTRACT

The present invention involves an air cycle system having a preventative icing feature for climate control of a vehicle cabin. The air cycle system includes a compressor for compressing air, an intercooler for cooling compressed air, an expander for expanding air pressure, and a means for controlling conditions of air at atmospheric pressure. The compressor has a compressor inlet for ambient air and a compressor outlet for compressed air. The intercooler has an intercooler inlet for receiving compressed air from the compressor and an intercooler outlet for exiting intercooled air. The expander has an expander inlet for receiving air from the intercooler and has an expander outlet for exiting air at atmospheric pressure at an expanded condition. The expanded condition of the air at atmospheric pressure is above the icing temperature of water to prevent icing at the expander outlet. Means or controlling the conditions of the air at atmospheric pressure are performed to maintain the air flow at the expander outlet to temperatures greater than the icing conditions at which water freezes.

32 Claims, 2 Drawing Sheets

SYSTEM AND METHOD OF PREVENTING ICING IN AN AIR CYCLE SYSTEM

BACKGROUND OF THE INVENTION

The present invention relates to air cycle systems and methods of reducing icing in air cycle systems for climate control of a vehicle cabin.

Air cycle systems are known and are used in some industries. An air cycle system may include an air compressor for receiving ambient air, an intercooler to receive compressed air from the compressor, and an expander in tandem to the air compressor for expanding the air.

In many air cycle systems, condensation is a concern. Manufacturers have been challenged in providing systems to efficiently handle condensation and icing when it occurs. For example, the humidity ratio at the inlet of the expander can be as high as 0.024 g/kg (water vapor/air). At the exit of the expander, the air can typically only hold a ratio of about 0.004 g/kg. The remainder of the water vapor condenses out, into liquid form. If however, the temperature exiting the expander is below freezing, the resulting condensate will turn to ice. Icing can cause problems relating to efficiency and plugging of the flow channels.

Thus, it is desired to further reduce or prevent icing from occurring in an air cycle system such as at the outlet of an expander.

BRIEF SUMMARY OF THE INVENTION

The present invention generally provides systems and methods of preventing or reducing icing within an air cycle system in an automotive vehicle. In air cycle systems, icing at the expander outlet can occur if the expander inlet air pressure, expander inlet air temperature, and relative humidity of the air are within certain ranges. It has been found that icing can be prevented at the expander outlet by adjusting the temperature of air at the expander inlet, or by adjusting the air pressure ratio across the expander. This may be accomplished by increasing the temperature of air at the expander inlet, or by decreasing the pressure ratio across the expander.

The present invention includes an air cycle system having a preventative icing feature for climate control of a vehicle cabin. The air cycle system comprises a compressor for compressing air, an intercooler for cooling air from the compressor, an expander for expanding air to atmospheric pressure, and means for controlling the air temperature exiting the expander. The compressor has a compressor inlet for receiving ambient air and a compressor outlet for exiting compressed air. The intercooler has an intercooler inlet for receiving compressed air from the compressor and an intercooler outlet for exiting the cooled air. The expander has an expander inlet for receiving air from the intercooler and an expander outlet for exhausting the air to the passenger cabin.

In one embodiment, means for controlling the air exiting the expander includes a by-pass system for by-passing air around the intercooler to control the expander inlet air temperature. In another embodiment, means for controlling the air temperature exiting the expander includes a temperature control system having a variable speed fan cooperating with the intercooler to control the efficiency of the intercooler. In yet another embodiment, means for controlling the air temperature exiting the expander includes a pressure control system having a valve cooperating with the expander to control the pressure ratio across the expander.

Other objects and advantages of the present invention will become apparent upon considering the following detailed description and appended claims, and upon reference to the accompanying drawings.

DETAILED DESCRIPTION OF THE INVENTION

Figure 1:
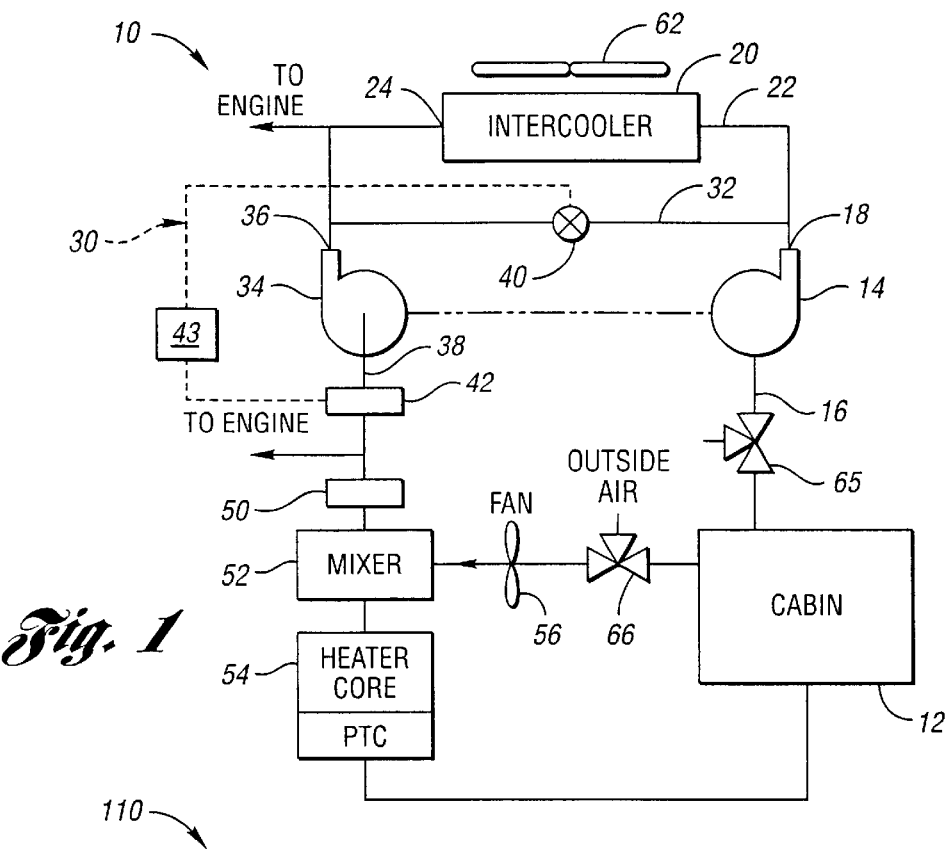
FIG. 1 is a schematic diagram of an air cycle system in accordance with one embodiment of the present invention.

FIG. 1 illustrates an air cycle system 10 having a preventative icing feature for climate control of a vehicle passenger cabin 12 in accordance with one embodiment of the present invention. As shown, the air cycle system 10 includes a compressor 14 for receiving air to be conditioned. The compressor 14 has a compressor inlet 16 for receiving air at ambient conditions and a compressor outlet 18 for air exiting the compressor. The air exiting the compressor may be at compressed conditions including ranges of about 1–3 Bar and about 60–120° C.

As shown, air cycle system 10 further includes an intercooler 20 for cooling the air exiting the compressor 14. The intercooler 20 has an intercooler inlet 22 for receiving compressed air from the compressor 14 and an intercooler outlet 24 for exiting intercooled air. A fan 62 blows ambient air over the intercooler, thus cooling the air therein. The exiting intercooled air may be at a first condition ranging from about 1–3 Bar and about 10–55° C. As will be described in greater detail below, the air cycle system 10 further includes a by-pass system 30 having a by-pass tube 32 for compressed air by-passing the intercooler 20.

As shown, an expander 34 is disposed downstream of the intercooler 20 and has an expander inlet 36 for receiving air from the intercooler and an expander outlet 38 for exiting air to the cabin. The expanded condition includes conditions of about 1 Bar (atmospheric pressure).

The by-pass system 30 allows air exiting the compressor to by-pass the intercooler 20. This is accomplished by allowing exiting compressed air from the compressor 14 to communicate directly with the intercooler outlet 24 or the expander inlet 36. As shown, the by-pass system 30 includes the by-pass tube 32 in fluid communication with the compressor outlet 18 and the expander inlet 36. This allows a ratio of the air exiting the compressor to by-pass the intercooler 20 to the expander 34, defining an intercooler bypass ratio. The intercooler inlet 22 is configured to receive a first portion of the air exiting the compressor based on the intercooler bypass ratio. The by-pass tube 32 is configured to receive a second portion of the compressed air based on the intercooler bypass ratio. The first portion may include up to 100% of the compressed air and the second portion may be the difference between the compressed air flow from the compressor 14 and the first portion of the compressed air.

As shown, the by-pass tube 32 includes a regulating valve 40 for controlling airflow through the by-pass tube 32. The by-pass system 30 further includes a sensor 42 disposed downstream from the intercooler 20 for sensing airflow conditions such as air temperature. The sensor 42 is in electrical feedback communication with the regulating valve 40 to control airflow through the by-pass tube 32 for maintaining the air temperature at the expanded condition above the icing temperature of water.

As shown, the airflow of the air cycle system 10 exits the expander 34 and splits to the engine (not shown) of the vehicle and/or it goes to a water separator 50. The water separator 50 separates the condensed water from the airflow as known in the art. A mixer 52 mixes the cooled air with air from the cabin 12 as known in the art. A fan 56 operates to assist airflow from the vehicle passenger cabin 12 as shown.

In this embodiment, the air cycle system 10 further includes flow control valves 65, 66 for allowing air intake between outside air and cabin air in system 10. As shown, flow control valve 65 is disposed between the cabin 12 and the compressor 14 and flow control valve 66 is disposed between the cabin 12 and the fan 56. Valves 65, 66 may be controlled by any suitable means known in the art.

In this embodiment, the sensor 42 may be in electrical communication with a microprocessor or a processing unit 43 to determine the temperature of the air at atmospheric pressure as it exits the expander 34. Thus, in this embodiment, the sensor senses air temperature at the expander outlet and transmits a signal to the processing unit wherein the signal is indicative of the air temperature. The processing unit compares the air temperature to the icing temperature of water. If the air temperature is determined to be less than or equal to the icing temperature of water, then the potential for condensed water to solidify is realized, and thus, the processing unit adjusts the intercooler bypass ratio of the air cycle system so that the air temperature at the expander outlet is greater than the icing temperature of water. This prevents condensed water from icing at the expander outlet.

It is to be understood that the sensor 42 may be disposed upstream, e.g., at the expander inlet, or downstream of the expander. If the sensor is disposed upstream, then the processing unit will be configured to compare the air temperature with a predetermined temperature at that location, based on variables such as pressure and relative humidity, so that the air temperature at the expander outlet is greater than the icing temperature of water to prevent icing thereat. It is also to be understood that adjusting the intercooler bypass ratio with the regulating valve may be accomplished by any suitable feedback control means known in the art.

Figure 2:
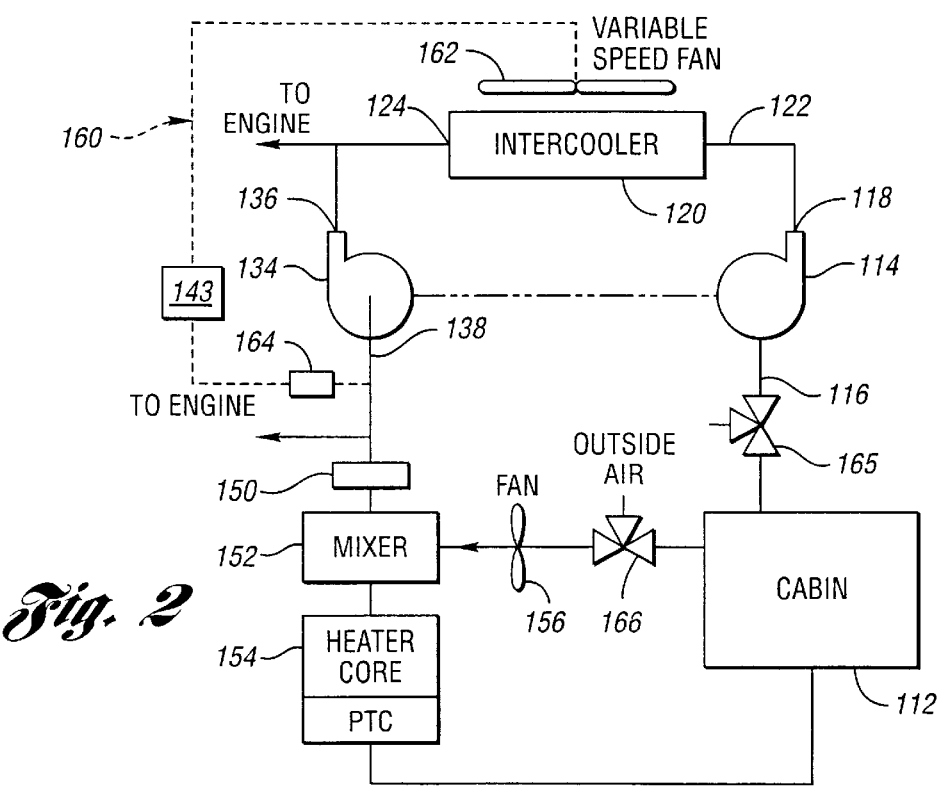
FIG. 2 is another schematic diagram of an air cycle system in accordance with another embodiment of the present invention.

FIG. 2 illustrates an air cycle system 110 having a preventative icing feature for climate control of a vehicle cabin 112 in accordance with another embodiment of the present invention. As shown, air cycle system 110 includes components similar to air cycle system 10 described above. For example, air cycle system 110 includes components such as compressor 114, intercooler 120, expander 134, water separator 150, mixer 152, fan 156, and flow control valves 165, 166 which are similar to compressor 14, intercooler 20, expander 34, water separator 50, mixer 52, fan 56, and flow control valves 65, 66 of air cycle system 10 mentioned above.

As shown, air cycle system 110 further includes a temperature control system 160 including a variable speed fan 162 cooperating with the intercooler 120 to control a first condition of the air at the intercooler, including ranges of about 1–3 Bar and about 10–120° C. As shown the temperature control system 160 has a sensor 164 disposed downstream of the intercooler 120 for sensing air flow conditions such as air temperature. The sensor 164 is in electrical feedback communication with the variable speed fan 162 to control fan speed for regulating the effectiveness of the intercooler 120. As a result, the temperature of the air exiting the expander 134 may be controlled so that the temperature of the air at atmospheric pressure at the expander outlet is above the icing temperature of water. Thus, the variable speed fan controls the first condition of the intercooled air from the intercooler so that the temperature of the air at the expander outlet is above the icing temperature of water.

In this embodiment, the sensor 164 may be in electrical communication with a microprocessor or a processing unit 165 to determine the temperature of the air at atmospheric pressure exiting the expander 134. Thus, in this embodiment, the sensor senses air temperature at the expander outlet and transmits a signal to the processing unit wherein the signal is indicative of the air temperature. The processing unit compares the air temperature to the icing temperature of water. If the air temperature is determined to be less than or equal to the icing temperature of water, then the potential for the condensed water to solidify is flagged, and, thus, the processing unit adjusts the fan speed of the variable speed fan 162 so that the air temperature at the expander outlet is greater than the icing temperature of water. This prevents condensed water from icing at the expander outlet.

It is to be understood that the sensor 164 may be disposed upstream, e.g., at the expander inlet, or downstream of the expander. If the expander is disposed upstream, then the processing unit will be configured to compare the air temperature with a predetermined temperature based on variables such as pressure and relative humidity so that the air temperature at the expander outlet is greater than the icing temperature of water.

It is also to be understood that adjusting the efficiency of the intercooler may be accomplished by any suitable feedback control means known in the art. Thus, the efficiency of the intercooler is adjusted so that the air temperature at the expander outlet is greater than the icing temperature of water, when it is determined that the air temperature at the expander outlet is less than or equal to the icing temperature of water.

Figure 3:
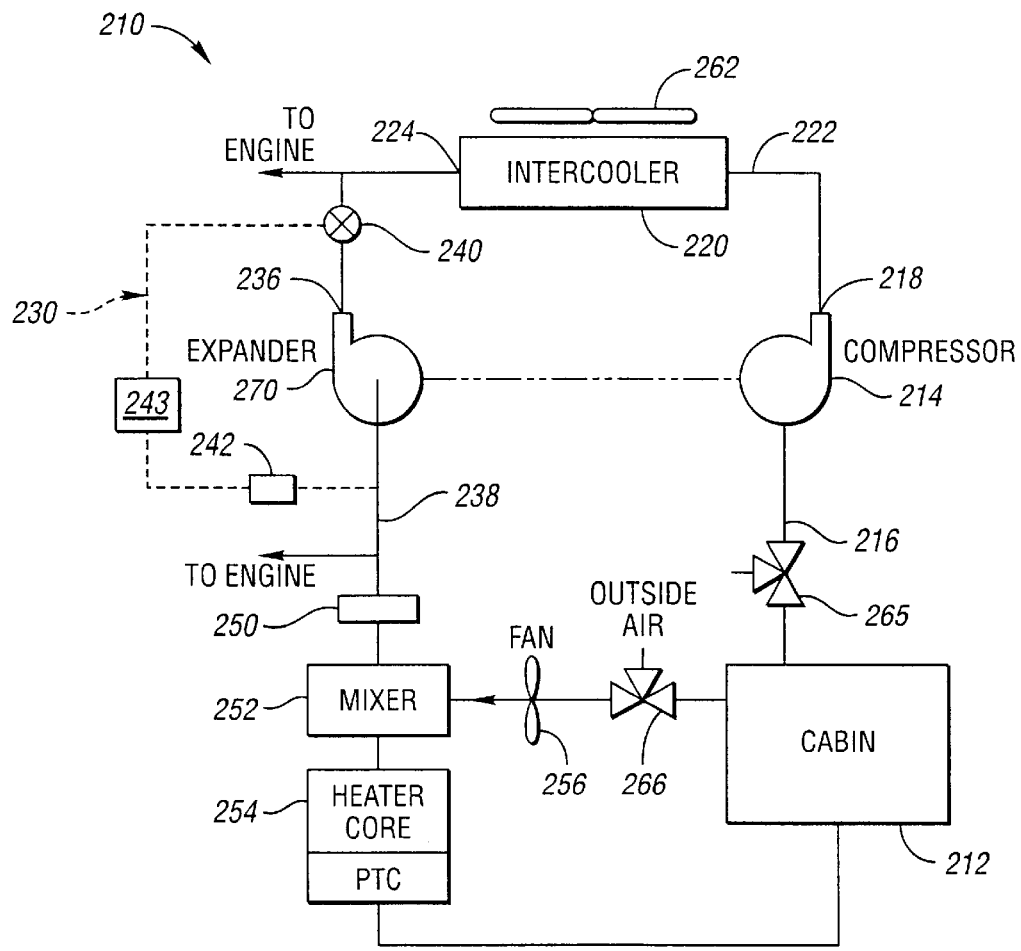
FIG. 3 is yet another schematic diagram of an air cycle system in accordance with yet another embodiment of the present invention.

FIG. 3 illustrates an air cycle system 210 having a preventative icing feature for climate control of a vehicle cabin 212 in accordance with yet another embodiment of the present invention. System 210 includes components similar to the air cycle system 10 described above. For example, air cycle system 210 includes components such as compressor 214, intercooler 220, water separator 250, mixer 252, heater core 254 and fan 256 which are similar to compressor 14, intercooler 20, water separator 50, mixer 52, heater core 54 and fan 56 of the air cycle system 10 mentioned above.

As shown, the air cycle system 210 includes a pressure control system 230. The pressure control system 230 includes a valve 240, e.g. a timing valve or any other suitable valve, disposed at the expander inlet 236, wherein the valve 240 is configured to control the pressure ratio across expander 270. The pressure control system 230 further includes a sensor 242 preferably disposed at the expander outlet for sensing air flow conditions such as air temperature. The sensor 242 is in electrical feedback communication with the valve 240 to control air pressure at the expander inlet for maintaining the air exiting the expander at a temperature above the icing temperature of water.

As shown, the air flow of air cycle system 210 exits the expander 270 and splits to the engine (not shown) of the vehicle and to a water separator 250 to separate condensed water from the air flow as known in the art. A mixer 252 mixes the cooled air with air from the cabin 212. A fan 256 operates to assist airflow toward the vehicle passenger cabin 212 as shown.

In this embodiment, the sensor 242 may be in electrical communication with a microprocessor or a processing unit 243 to determine the temperature of the air at atmospheric pressure as it exits the expander 270. Thus, in this embodiment, the sensor senses air temperature at the expander outlet and transmits a signal to the processing unit wherein the signal is indicative of the air temperature. The processing unit compares the air temperature to the icing temperature of water. If the air temperature is determined to be less than or equal to the icing temperature of water, then the potential for condensed water to solidify is realized, and thus, the processing unit adjusts the pressure ratio of air the across the expander so that the air temperature at the expander outlet is greater than the icing temperature of water. This prevents condensed water from icing at the expander outlet.

The pressure control system adjusts the pressure ratio across the expander 270 that has a variable volumetric intake capacity. The compression ratio across the expander may range between about 1.2:1 and 3.0:1. In this embodiment, expander 270 may have a capacity ranging from about 500 to 900 cubic centimeters per revolution, in an instance where the compressor 214 has an intake capacity of 900 cubic centimeters per revolution. By increasing the intake volumetric capacity of the expander, the pressure ratio will reduce. The air temperature exiting the expander is therefore greater than the icing temperature of water.

It is to be understood that the embodiments of the systems and methods mentioned above may also depend further on the relative humidity of ambient air received by the compressor. Thus, depending on the ambient relative humidity, icing of water vapor (reverse sublimation) may occur at varying temperatures at or below conventional freezing temperatures. These occasions are relatively rare however and exist only in very dry ambient conditions. More prevalent however is the effect of humidity ratio on the cooling effect in the expander. This can change markedly the desired condition at the inlet to the expander. Thus, the microprocessor or processing unit is configured to incorporate such factors involved in determining the air temperature needed to prevent or reduce icing.

The foregoing discussion discloses and describes the preferred embodiment of the invention. One skilled in the art will readily recognize from such discussion, and from the accompanying drawings and claims, that changes and modifications can be made to the invention without departing from the true spirit and fair scope of the invention as defined in the following claims. The invention has been described in an illustrative manner, and it is to be understood that the terminology which has been used is intended to be in the nature of words of description rather than of limitation.

What is claimed is:

1. An air cycle system having a preventative icing feature for climate control of a vehicle cabin, the air cycle system comprising:

a compressor for compressing air, the compressor having a compressor inlet for ambient air and a compressor outlet for exiting compressed air;

an intercooler for cooling air, the intercooler having an intercooler inlet for receiving compressed air from the compressor and an intercooler outlet for exiting intercooled air;

an expander having an expander inlet for receiving air from the intercooler, the expander having an expander outlet for exiting air at expanded conditions; and means for controlling the expanded condition of the air at the expander outlet, the air at atmospheric pressure being above the icing temperature of water to prevent icing at the expander outlet.

2. The system of claim 1 wherein the air exiting the expander is at atmospheric pressure.

3. The system of claim 1 wherein the air exiting the compressor is at compressed conditions.

4. The system of claim 3 wherein the compressed conditions include ranges of about 1–3 Bar and about 60–120° C.

5. The system of claim 1 wherein the inner cooled air is at a first condition including ranges of about 1–3 Bar and about 10–55° C.

6. The system of claim 1 wherein the means for controlling includes a by-pass system for by-passing air around the intercooler, the by-pass system including a by-pass tube in fluid communication with the compressor outlet and the intercooler outlet allowing a ratio of the compressed air to by-pass the intercooler to the expander, the by-pass tube having a valve for controlling air flow through the by-pass tube, the by-pass system having a sensor disposed downstream from the intercooler for sensing air flow conditions, the sensor being in electrical feedback communication with the valve to control air flow through the by-pass tube for maintaining the air at the expanded condition above the icing temperature of water.

7. The system of claim 1 wherein the means for controlling includes a temperature control system including a variable speed fan cooperating with the intercooler to control a first condition of the intercooled air from the intercooler, the temperature control system having a sensor disposed downstream from the intercooler for sensing air flow conditions, the sensor being in electrical feedback communication with the variable speed fan to control the first condition of the intercooled air from the intercooler, so that the temperature of the air at the expander outlet is above the icing temperature of water.

8. The system of claim 1 wherein the means for controlling includes a pressure control system including a valve cooperating with the expander for controlling pressure ratio of the air across the expander inlet, the pressure control system including a sensor disposed at the expander outlet for sensing air flow conditions, the sensor being in electrical feedback communication with the valve to control the pressure ratio across the expander, so that the temperature of the air at the expander outlet is above the icing temperature of water.

9. The system of claim 1 further comprising a by-pass tube in fluid communication with the compressor outlet and the intercooler outlet, the intercooler inlet being configured to receive a first portion of the compressed air and the by-pass tube being configured to receive a second portion of the compressed air.

10. The system of claim 9 wherein the first portion includes up to 100% of the compressed air and the second portion is the difference between the compressed air from the compressor and the first portion of the compressed air.

11. The system of claim 1 wherein the expanded condition includes conditions of about 1–3 Bar.

12. An air cycle system having a preventative icing feature for climate control of a vehicle cabin, the air cycle system comprising:

a compressor for compressing air, the compressor having a compressor inlet for ambient air and a compressor outlet for compressed air;

an intercooler for cooling air, the intercooler having an intercooler inlet for receiving a intercooler bypass ratio of the compressed air from the compressor and an intercooler outlet for exiting intercooled air at a first condition;

an expander having an expander inlet for receiving air from the intercooler and the compressor, the expander having an expander outlet for exiting air at atmospheric pressure at an expanded condition greater than an icing temperature of water; and a by-pass system for by-passing air from the intercooler, the by-pass system including a by-pass tube in fluid communication with the compressor outlet and the intercooler outlet allowing the ratio of the compressed air to by-pass the intercooler to the expander, the by-pass tube having a valve for controlling air flow through the by-pass tube, the by-pass system having a sensor for sensing air flow conditions, the sensor being in electrical feedback communication with the valve to control air flow through the by-pass tube for maintaining the air at atmospheric pressure at the expanded condition above the icing temperature of water.

13. The system of claim 12 wherein the air inlet is at ambient conditions.

14. The system of claim 12 wherein the compressed air is at compressed conditions.

15. The system of claim 14 wherein the compressed conditions include ranges of about 1–3 Bar and about 60–120° C.

16. The system of claim 12 wherein the intercooled air is at a first condition including ranges of about 1–3 Bar and about 10–55° C.

17. The system of claim 12 further comprising a temperature control system including a variable speed fan cooperating with the intercooler to control a first condition of the intercooled air from the intercooler, the temperature control system having a sensor disposed downstream from the intercooler for sensing air flow conditions, the sensor being in electrical feedback communication with the variable speed fan to control the first condition of the intercooled air from the intercooler so that the temperature of the air at atmospheric pressure at the expander outlet is above the icing temperature of water.

18. The system of claim 17 further comprising:
    a heater core for heating air;
    a mixer in fluid communication with the heater core and the expander for mixing cooled and heated air; and
    a fan for blowing the mixed cooled and heated air into the vehicle cabin.

19. The system of claim 12 wherein the expanded condition includes conditions of about 1–2 Bar.

20. An air cycle system for climate control of a vehicle cabin, the air cycle system comprising:
    a compressor for compressing air, the compressor having a compressor inlet for ambient air and a compressor outlet for compressed air;
    an intercooler for cooling air, the intercooler having an intercooler inlet for receiving the compressed air from the compressor and an intercooler outlet for exiting inner cooled air at a first condition;
    an expander having an expander inlet for receiving air from the intercooler, the expander having an expander outlet for exiting air at atmospheric pressure at an expanded condition above an icing temperature of water; and
    a temperature control system including a variable speed fan cooperating with the intercooler to control a first condition of the intercooled air from the intercooler, the temperature control system having a sensor for sensing air flow conditions, the sensor being in electrical feedback communication with the variable speed fan to control the first condition of the intercooled air from the intercooler, so that the temperature of the air at atmospheric pressure at the expander outlet is above the icing temperature of water.

21. The system of claim 20 wherein the air inlet is at ambient conditions.

22. The system of claim 20 wherein the compressed air is at compressed conditions.

23. The system of claim 22 wherein the compressed conditions include ranges of about 1–3 Bar and about 70–110° C.

24. The system of claim 20 wherein the intercooled air is at the first condition including ranges of about 1–3 Bar and about 15–45° C.

25. The system of claim 20 wherein the expanded condition includes conditions of about 1–3 Bar.

26. A method of reducing icing at an expander in an air cycle system, the method comprising:
    providing an expander inlet of the expander for receiving compressed air from a compressor and an intercooler and an expander outlet of the expander for exiting air at atmospheric pressure having a intercooler bypass ratio, the compressed air being at a first temperature and the air at atmospheric pressure being at a second temperature;
    sensing air temperature within the air cycle system;
    comparing the second temperature at the outlet to an icing temperature of water based on sensing one of the first and second temperatures;
    adjusting the intercooler bypass ratio of the air cycle system so that the air temperature at the expander outlet is greater than the icing temperature of water, if the air temperature of the air at atmospheric pressure is determined to be greater than the icing temperature.

27. The method of claim 26 wherein sensing is performed at one of the expander inlet and the expander outlet.

28. A method of reducing icing at an expander outlet of an expander in an air cycle system for a vehicle cabin climate control, the method comprising:
    providing an intercooler having an intercooler outlet for exiting intercooled air therefrom and providing an expander for receiving the intercooled air and for exiting air at atmospheric pressure, the intercooled air having a first temperature and the air at atmospheric pressure having a second temperature;
    sensing air temperature within the air cycle system;
    comparing the second air temperature to an icing temperature of water based on sensing one of the first and second air temperatures;
    adjusting the efficiency of the intercooler so that the air temperature at the expander outlet is greater than the icing temperature of water, if it is determined that the air temperature is greater than the icing temperature of water.

29. The method of claim 28 wherein sensing is at one of the expander inlet and the expander outlet.

30. A method of reducing icing at an expander in an air cycle system for a vehicle cabin climate control, the method comprising:
    providing a compressor having a compressor outlet for exiting compressed air therefrom, an intercooler having an intercooler inlet for air at atmospheric pressure and an intercooler outlet for exiting intercooled air, and an expander having an expander inlet for the intercooled air and an expander outlet for air at atmospheric pressure, the compressor and the expander having a compression ratio, the intercooled air being at a first air temperature and the air at atmospheric pressure being at a second air temperature;

sensing air temperature within the air cycle system;

comparing the second air temperature to an icing temperature of water based on sensing one of the first and second air temperatures to determine if the second air temperature is greater than the icing temperature of water;

adjusting the compression ratio across the expander so that the air temperature at the outlet is greater than the icing temperature of water, if it is determined that the air temperature is greater than the icing temperature of water.

31. The method of claim 30 wherein sensing is at one of the expander inlet and the expander outlet.

32. The method of claim 30 wherein the compression ratio ranges between about 1.2:1 and 3.0:1.

* * * * *